United States Patent
Tischler et al.

Patent Number: 5,594,725
Date of Patent: Jan. 14, 1997

[54] PROCESS AND SYSTEM FOR VIDEO RATE CONTROL IN A MULTIPOINT VIDEO CONFERENCE

[75] Inventors: Paul V. Tischler; Bill Clements, both of Austin, Tex.

[73] Assignee: Vtel Corporation, Austin, Tex.

[21] Appl. No.: 580,137

[22] Filed: Dec. 28, 1995

[51] Int. Cl.⁶ .................... H04N 7/18; H04J 3/22
[52] U.S. Cl. .............. 370/260; 370/391; 370/505; 348/15
[58] Field of Search .................. 370/62, 93, 84, 370/82, 60.1, 94.2, 94.3, 100.1, 102, 85.7; 348/13, 14, 15, 16, 17; 379/202, 204, 206; 395/200.04

[56] References Cited

U.S. PATENT DOCUMENTS

| | | | |
|---|---|---|---|
| 4,282,400 | 8/1981 | Ribera et al. | 370/93 |
| 5,315,633 | 5/1994 | Champa | 348/16 |
| 5,325,194 | 6/1994 | Natori et al. | 348/15 |
| 5,371,535 | 12/1994 | Takizawa | 348/15 |
| 5,473,363 | 12/1995 | Ng et al. | 348/15 |

*Primary Examiner*—Douglas W. Olms
*Assistant Examiner*—Chau T. Nguyen
*Attorney, Agent, or Firm*—Baker & Botts, L.L.P.

[57] ABSTRACT

A multipoint video conference system (8) is provided that has video rate control and allows communication of audio, video and data information between end-point units (16). The multipoint video conference system comprises a multipoint control unit (10, 20) having a plurality of interface units (12, 22) located therein. Each interface unit (12, 22) is operable to communicate with other interface units (12, 22) via a backplane (14, 24) of the multipoint control unit (10, 20). A plurality of end-point units (16) are each coupled to an associated interface unit (12, 22). Each end-point unit (16) is operable to communicate and process real data information and operable to receive and resend fill data information. The multipoint control unit (10, 20) is operable, with respect to each participating end-point unit (16) in a data channel, to allow communication of real data information and, with respect to each non-participating end-point unit (16), to allow communication of an equal amount of fill data information. Each interface unit (12, 22) is operable to transmit real data information to a participating end-point unit and to transmit fill data information to a non-participating end-point unit (16). Each non-participating end-point unit (16) is operable to retransmit fill data information back to an associated interface unit (12, 22) such that available bandwidth for video information remains balanced for all end-point units (16) when a data channel is open between participating end-point units (16).

20 Claims, 2 Drawing Sheets

| | END-POINT UNIT | | | |
|---|---|---|---|---|
| | A | B | C | D |
| TOTAL BANDWIDTH | 384K | 384K | 384K | 384K |
| AUDIO | MIX ABCD (64K) | MIX ABCD (64K) | MIX ABCD (64K) | MIX ABCD (64K) |
| OVERHEAD | (2K) | (2K) | (2K) | (2K) |
| VIDEO | C (254K) | C (254K) | A (254K) | C (254K) |
| DATA | B (64K) | A (64K) | FILL (64K) | FILL (64K) |

15,594,725

PROCESS AND SYSTEM FOR VIDEO RATE CONTROL IN A MULTIPOINT VIDEO CONFERENCE

TECHNICAL FIELD OF THE INVENTION

This invention relates in general to electronic systems, and more particularly to a process and system for video rate control in a multipoint video conference.

BACKGROUND OF THE INVENTION

In multipoint video conferences between multiple end-point conference sites, it is often desirable to open a point-to-point data channel or other data channel between conference participants. However, opening of a data channel can cause a communications bandwidth imbalance in conventional multipoint video conferencing systems. End-point units located at each non-participating conference site, which are not receiving data information via the data channel, may remain capable of sending and receiving more video information than participating end-point units, which are processing the data channel. Such a bandwidth imbalance can cause video buffer overruns and loss of frame synchronization in the control of the multipoint conference which in turn degrades video performance for all conference participants.

Another disadvantage of some conventional systems is that in order to open a data channel, a bitstream template is set and remains set throughout the multipoint conference so that the data bandwidth is set aside regardless of whether it is being used. It is desirable for a conference site to be allowed to open and close data channels between other conference sites without being forced to define the data channels initially and without consuming bandwidth when no data channel is needed.

SUMMARY OF THE INVENTION

In accordance with the present invention, a process and system for video rate control in a multipoint video conference are provided that substantially eliminate or reduce disadvantages and problems with prior multipoint video conference systems.

According to one embodiment of the present invention, a multipoint video conference system is provided that has video rate control and allows communication of audio, video and data information between end-point units. The multipoint video conference system comprises a multipoint control unit having a plurality of interface units located therein. Each interface unit is operable to communicate with other interface units via a backplane of the multipoint control unit. A plurality of end-point units are each coupled to an associated interface unit. Each end-point unit is operable to communicate and process real data information and operable to receive and resend fill data information. The multipoint control unit is operable, with respect to each participating end-point unit in a data channel, to allow communication of real data information and, with respect to each non-participating end-point unit, to allow communication of an equal amount of fill data information. Each interface unit is operable to transmit real data information to a participating end-point unit and to transmit fill data information to a non-participating end-point unit. Each non-participating end-point unit is operable to retransmit fill data information back to an associated interface unit such that available bandwidth for video information remains balanced for all end-point units when a data channel is open between participating end-point units.

A technical advantage of the present invention is the provision of a multipoint video conference system in which a data channel can be opened between two end-point units without degrading video throughout the multipoint video conference by maintaining balanced video bandwidth between participating and non-participating end-point units. In such a multipoint video conference, a conference site can be allowed to open and close data channels between other conference sites while the conference takes place.

A technical advantage of the present invention is providing flexible video rate control for balancing available video bandwidth in a multipoint video conference. The process of the present invention allows users of end-point units in the multipoint video conference to send and receive real data information such as a PC conference, fax, RS232, and RS449 in point-to-point data channels without degrading video information transmission during this data transfer.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figures 1, 2:
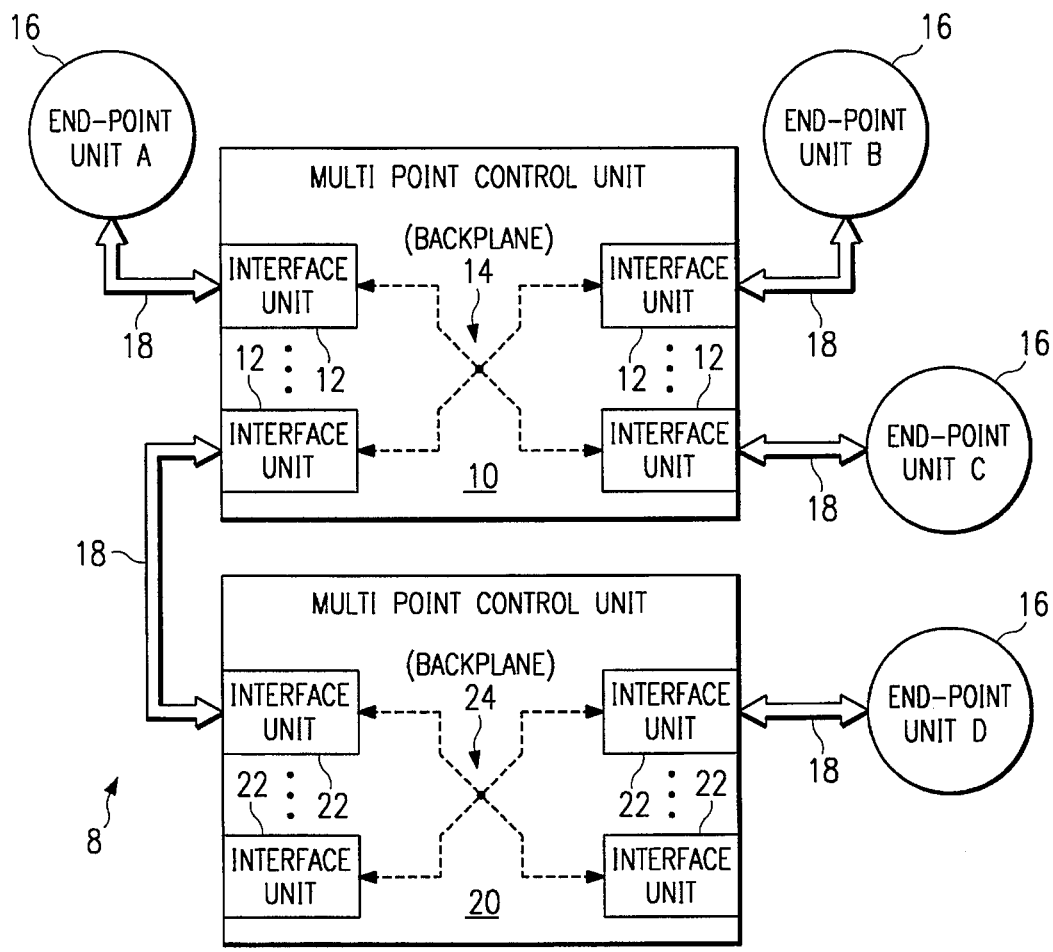
FIG. 1 is a block diagram of a multipoint video conference system constructed according to the teachings of the present invention.
FIG. 2 illustrates one embodiment of use of bandwidth for the end-point units of FIG. 1 according to the teachings of the present invention.

FIG. 1 is a block diagram of a multipoint video conference system, indicated generally at 8, constructed according to the teachings of the present invention. System 8 comprises a first multipoint control unit 10. In one embodiment of the present invention, multipoint control unit 10 comprises an MCU available from VTEL Corporation located in Austin, Tex.

A plurality of interface units 12 are located in multipoint control unit 10 and communicate via a backplane plane 14 of multipoint control unit 10. In one embodiment of the present invention, each interface unit 12 comprises a video conference card (VCC) available from VTEL Corporation. Three end-point units 16 are each coupled to an associated interface unit 12 via a communication link 18. In one embodiment of the present invention, communication link 18 comprises a connection across a telephone line or a direct electronic connection.

A second multipoint control unit 20 comprises a plurality of interface units 22 which communicate via a backplane 24 of multipoint control unit 20. Multipoint control unit 20 is coupled to multipoint control unit 10 via a communication link 18. A fourth end-point unit 16 is coupled to an associated interface unit 22 via an additional communication link 18, as shown.

In operation, system 8 can establish and maintain a multipoint video conference between end-point units 16 in which audio, video and data information can be communicated between end-point units 16. In general, each end-point unit 16 has a specified total bandwidth for transmission of information. The bandwidth of each end-point unit 16 can be divided between audio, video and data information as necessary. Communication of information between end-point units can comprise a time division multiplexed (TDM) scheme, a packet-based asynchronous transferred mode (ATM) Scheme, or other suitable communication scheme.

In the illustrated embodiment, a packet-based communication scheme is used. In this embodiment, the bandwidth for transmission of information for each end-point unit 16 is established by the number of fixed-size packets transmitted per second. In one embodiment, the packets are 256 bytes in size and are transmitted at a rate of 192 packets per second providing a total bandwidth of 384K bits per second. In this embodiment, 64K bits can be dedicated to audio information, and 2K bits can be dedicated to control or overhead leaving 318K bits available for video and/or data information. Generally, this 318K bits can be used for video information unless a data channel is opened.

According to the teachings of the present invention, when a data channel is opened between two end-point units 16, non-participating end-point units 16 are induced to send less video information in order to balance the video bandwidth between all end-point units 16 in the multipoint video conference. This video rate control to balance end-points 16 is accomplished by multipoint control units 10 and 20 and interface units 12 and 22 communicating data information to participating end-point units 16 as real data information and to non-participating end-point units 16 as fill data information.

End-point units 16 then operate differently depending upon whether they are participating or non-participating with respect to the data channel. Each end-point unit 16 is operable to communicate and process real data information. With respect to fill data information, each end-point unit 16 is operable to receive fill data information and transmit it back to the respective interface unit 12 or 22 in multipoint control unit 10 or multipoint control unit 20. Thus, end-point units 16 that are participating in the data channel communicate real data information while non-participating end-point units 16 communicate fill data information thereby balancing the video rates for end-point units 16.

When a data channel is opened between end-point units 16, multipoint control units 10 and 20 and associated interface units 12 and 22 allow participating end-point units 16 to communicate real data information. Multipoint control units 10 and 20 and associated interface units 12 and 22 also allow each non-participating end-point unit 16 to communicate an equal amount of fill data information. Multipoint control units 10 and 20 and interface units 12 and 22 also are operable to use the amount of real data information communicated between participating end-point units 16 to meter the fill data information transmitted to non-participating end-point units 16.

In operation, multipoint control units 10 and 20 provide information to interface units 12 and 22, respectively, which operate to transmit information to associated end-point units 16 and to receive information transmitted by associated end-point units 16. The transmission of fill data information to non-participating end-points 16 ensures that available bandwidth for video remains balanced for end-point units 16 when a data channel is opened between a subset of end-point units 16.

It should be understood that, absent video rate control to balance video bandwidth for end-point units 16, imbalances in video bandwidth would degrade video performance for all end-point units 16 in a multipoint video conference.

For example, a data channel may be opened between end-point unit 16 labeled "A" and end-point unit 16 labeled "B". In this situation, in order to open the data channel, end-point unit A and end-point unit B would have their video bandwidth reduced by the bandwidth of the data channel when data information is communicated. Absent video rate control, end-point units 16 labeled "C" and "D" would not have their video bandwidth similarly reduced. If end-point unit A were to receive video from end-point unit C, which is sent at end-point unit C's larger video bandwidths, interface unit 12 connected to end-point unit A will not be able to handle that larger amount of video information.

According to the teachings of the present invention, this problem is solved by having interface units 12 and 22 associated with non-participating end-point units 16 transmit fill data information to non-participating end-point units 16 which then retransmission or loop, the fill data thereby reducing bandwidth available for video transmission. This retransmission or looping of fill data balances the video bandwidths for the non-participating end-point units 16 in the video conference.

A technical advantage of the present invention is the provision of a multipoint video conference system in which a data channel can be opened between two end-points without degrading video throughout the multipoint video conference by maintaining balanced video bandwidth between participating and non-participating end-points. In such a multipoint video conference, a conference site can be allowed to open and close data channels between other conference sites while the conference takes place.

FIG. 2 illustrates one embodiment of use of bandwidth for end-point units 16 of FIG. 1 according to the teachings of the present invention. In this embodiment, each end-point unit communicates using 256 byte packets providing 384K bits per second of bandwidth, as described above. As shown in FIG. 2, during an interval of time when the data channel is used, 64K bits of the 384K bit bandwidth is used for audio information. In the illustrated embodiment, the audio information comprises a mix of the audio from endspoint units A, B, C and D, and the audio bandwidth is fixed at 64K bits. A bandwidth of 2K bits is used for overhead. This leaves a bandwidth of 318K bits for video and data information.

With respect to video information, for this example, end-point units A, B and D receive video from end-point unit C, as shown. End-point unit C receives video from end-point unit A. This distribution of video might arise when end-point unit C is the current talker in the multipoint video conference and end-point unit A was the previous talker.

As shown, with respect to data information, end-point units A and B have a data channel open between them and communicate real data information with each other. During a one second interval, real data information uses 64K bits from the total 384K bits of bandwidth. According to the teachings of the present invention, non-participating end-point units C and D use 64K bits of their 384K bits of bandwidth for fill data information and receive 64K bits of fill data information. In one embodiment, this fill data information comprises portions of the real data information being communicated between end-point units A and B, redesignated as fill data. Also in this embodiment, each interface unit associated with a non-participating end-point unit counts the bits of real data received, but discards interim real data. When the count equals a specified fixed limit for the data channel, the interface unit sends fill data to the associated end-point to consume the available data bandwidth. In this manner, video bandwidth is balanced between end-point units A, B, C and D during the period of time that end-point units A and B have a data channel open between them.

Figure 3:
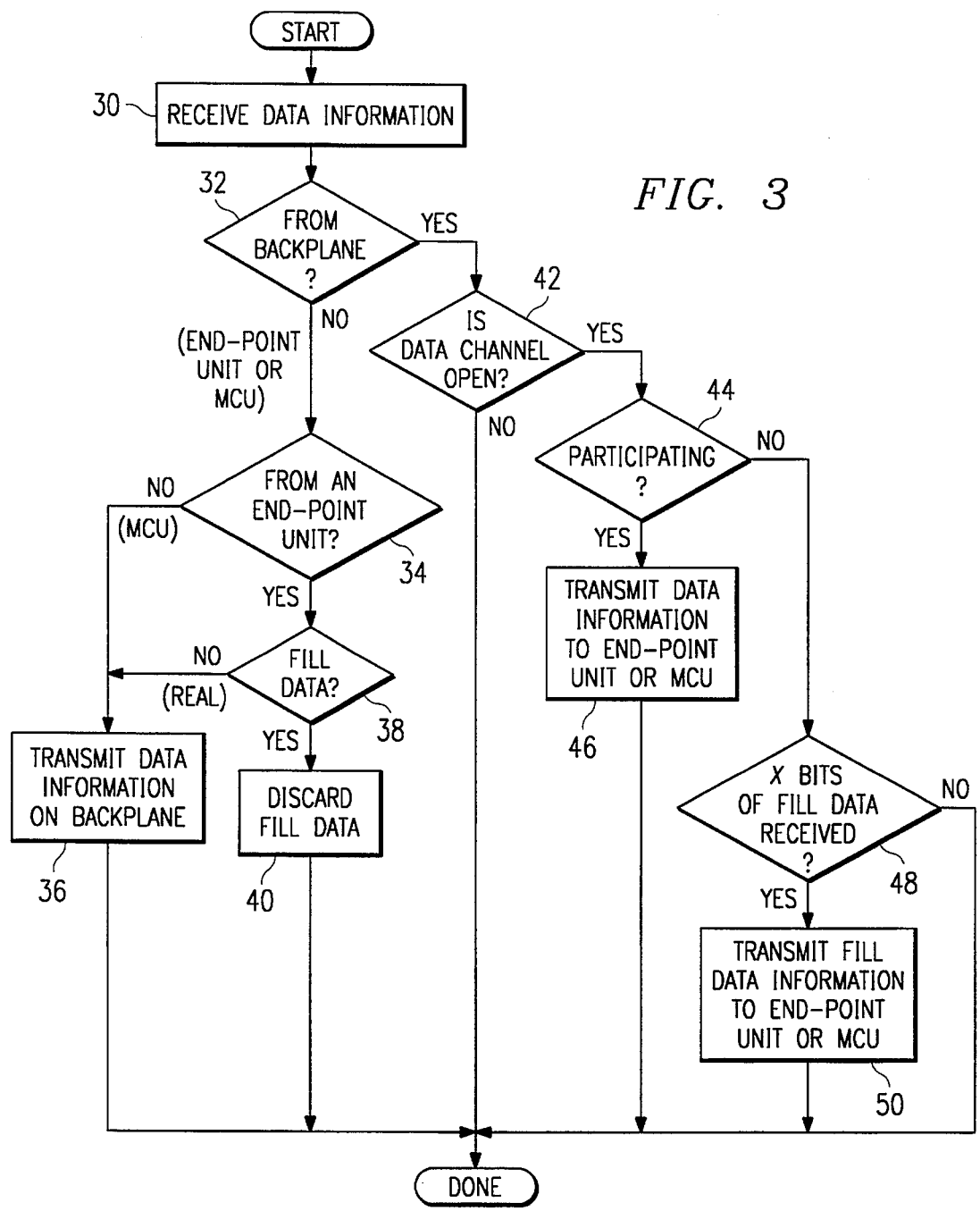
FIG. 3 is a flow chart of a process for video rate control in a multipoint video conference according to the teachings of the present invention.

FIG. 3 is a flow chart of a process for video rate control in a multipoint video conference according to the teachings of the present invention. The process of FIG. 3 applies to an interface unit in a multipoint video conference where a data channel is to be opened between conference participants such that there will be end-point units participating in the data channel and end-point units not participating in the data channel.

In step 30, the interface unit receives data information. This data information may comprise real data or fill data information and may be received from an end-point unit, the backplane of the multipoint control unit or from another multipoint control unit.

In step 32, the interface unit determines whether the data information was received from the backplane. If not, in step 34, the interface unit determines whether the data information was received from an end-point unit. If not, then the data information was received from a multipoint control unit, and the interface unit transmits the data information on the backplane in step 36.

If the data information was received from an end-point unit, then the interface unit, in step 38, determines whether the data information is fill data. If so, the interface unit discards the fill data in step 40. If not, the data information is real data, and the interface unit transmits the data information on the backplane in step 36.

If in step 32, the data information was received from the backplane, then the data information is real data, and the interface unit determines whether there is a data channel open in step 42. If not, the process is completed. If so, the interface unit determines, in step 44, whether the associated end-point unit or multipoint control unit is participating. If so, then the interface unit, in step 46, transmits the data information to the associated end-point unit or multipoint control unit.

If the associated end-point unit or multipoint control unit is not participating, then, in step 48, the interface unit determines whether X bytes of data information have been received. For example, X may be 64 bytes and represent a balance between bandwidth and compute overhead. If X bytes have not been received, processing of data information is complete until more data information is received. If X bytes have been received, the interface unit transmits, in step 50, fill data information to the associated end-point unit or multipoint control unit. In one embodiment, the fill data comprises portions of the last received data information along with dummy data.

The fill data information communicated to non-participating end-point units ensures that available bandwidth for video remains balanced for all end-point units in the multipoint video conference during the period of time that the data channel is open between participating end-point units.

Each end-point unit is operable to process real data information as appropriate for the type of data channel. With respect to fill data information, each end-point unit is operable to resend the fill data information back to the associated interface unit.

In one embodiment in which a packet scheme is used for communication, the process of FIG. 3 ensures that the packets communicated by an interface unit associated with an end-point unit in an interval of time contains an amount of video information balanced with the available video bandwidth. In a situation where a conference site can open and close data channels as desired, the system and process of the present invention provides flexibility and ensures consistent communication of video, data and audio information. According to the present invention, when a data channel is opened, all end-point units adapt such that available video bandwidth is balanced. When the data channel is closed, all end-points can return to an initial use of video bandwidth.

A technical advantage of the present invention is providing flexible video rate control for balancing available video bandwidth in a multipoint video conference. The process of the present invention allows users of end-point units in the multipoint video conference to send and receive real data information such as a PC conference, fax, RS232, and RS449 in point-to-point data channels without degrading video information transmission during this data transfer.

Although the present invention has been described in detail, it should be understood that various changes, substitutions and alterations can be made hereto without departing from the spirit and scope of the invention as defined by the appended claims.

What is claimed is:

1. A multipoint video conference system having video rate control and allowing communication of audio, video and data information between end-point units, the multipoint video conference system comprising:

a multipoint control unit having a plurality of interface units located therein, each interface unit operable to communicate with other interface units via a backplane of the multipoint control unit; and a plurality of end-point units, each end-point unit coupled to an associated interface unit;

each end-point unit operable to communicate and process real data information and operable to receive and resend fill data information;

the multipoint control unit operable, with respect to each participating end-point unit in a data channel, to allow communication of real data information and, with respect to each non-participating end-point unit, to allow communication of an equal amount of fill data information;

each interface unit operable to transmit real data information to a participating end-point unit and to transmit fill data information to a non-participating end-point unit; and each non-participating end-point unit operable to retransmit fill data information back to an associated interface unit;

such that available bandwidth for video information remains balanced for all end-point units when a data channel is open between participating end-point units.

2. The system of claim 1, wherein a total bandwidth for transmission of information is set by a number of fixed-size packets transmitted in an interval of time in a packet-based asynchronous transfer mode scheme.

3. The system of claim 2, wherein the size of the packets is 256 bytes and the bandwidth is 384K bits per second.

4. The system of claim 3, wherein said the amount of bandwidth for data comprises 64K bits of the 384K bits per second.

5. The system of claim 1, wherein the data channel comprises a point-to-point data channel between two end-point units.

6. The system of claim 5, wherein the point-to-point data channel comprises a point-to-point data channel for a facsimile transmission.

7. The system of claim 6, wherein the point-to-point data channel comprises a point-to-point data channel for a PC conference.

8. A process for video rate control in a multipoint video conference in which audio, video and data information can be communicated between end-point units, the process comprising:

opening a data channel between participating end-point units, said opening comprising;

allowing communication of real data information between participating end-point units; and communicating real data information between the participating end-point units, wherein the participating end-points process the real data information as real data;

allowing communication of an equal amount of fill data information by a non-participating end-point unit;

transmitting fill data information to the non-participating end-point; and receiving the fill data information in and retransmitting the fill data information by the non-participating end-point unit;

such that available bandwidth for video information remains balanced for all end-point units in the multipoint video conference when the data channel is open between the participating end-point units.

9. The process of claim 8, wherein said opening a data channel is accomplished by a multipoint control unit.

10. The process of claim 9, wherein said communicating data information and said transmitting fill data information are accomplished by the multipoint control unit using interface units and a backplane on which the interface units can communicate.

11. The process of claim 8, wherein said opening a data channel comprises opening a point-to-point data channel between two end-point units.

12. The process of claim 11, wherein said opening a point-to-point data channel comprises opening point-to-point data channel for a facsimile transmission.

13. The process of claim 11, wherein said opening a point-to-point data channel comprises opening point-to-point data channel for a PC conference.

14. The process of claim 8, wherein said opening a data channel comprises opening a data channel between end-point units having a total bandwidth for transmission of information set by transmission of a number of fixed-size packets per second in a packet-based asynchronous transfer mode scheme.

15. The process of claim 14, wherein the size of the packets is 256 bytes and the bandwidth is 384K bits per second.

16. The process of claim 15, wherein said allowing communication comprises allowing communication of 64K bits of the bandwidth for real data information and fill data information, respectively.

17. A process for video rate control in a multipoint video conference in which audio, video and data information can be communicated between end-point units, the process comprising:

opening a data channel between participating end-point units, each end-point unit in the multipoint video conference operable to communicate information using packets having a specified total size and transmitted at a given rate per second, said opening accomplished by a multipoint control unit and comprising;

allowing communication of real data as a portion of packets communicated with a participating end-point, said allowing communication accomplished by the multipoint control unit; and communicating packets between the participating end-point units, wherein the participating end-point units process the real data information as real data, said communicating accomplished by the multipoint control unit using interface units and a backplane of the multipoint control unit;

allowing communication of fill data as an equal portion of packets communicated with a non-participating end-point unit, said allowing communication accomplished by the multipoint control unit;

transmitting packets to the non-participating end-point unit, said transmitting accomplished by the multipoint control unit using the interface units and the backplane of the multipoint control unit; and receiving packets in and retransmitting packets by the non-participating end-point unit, without processing the fill data information as real data;

such that portions of packets for video information remain balanced for all end-point units in the multipoint video conference when the data channel is open between the participating end-point units.

18. The process of claim 17, wherein the size of the packets is 256 bytes which provide a bandwidth of 384K bits per second.

19. The process of claim 18, wherein said allowing communication comprises allowing communication of 64K bits of the packets for real data information and fill data information, respectively.

20. The process of claim 10, wherein opening a data channel comprises opening a point-to-point data channel between two end-point units.

* * * * *